Aug. 2, 1938.  W. A. McLEAN  2,125,455
MIXING DEVICE FOR PREPARING MIXTURES SUCH AS MAYONNAISE AND SALAD DRESSING
Filed March 31, 1936  3 Sheets-Sheet 1
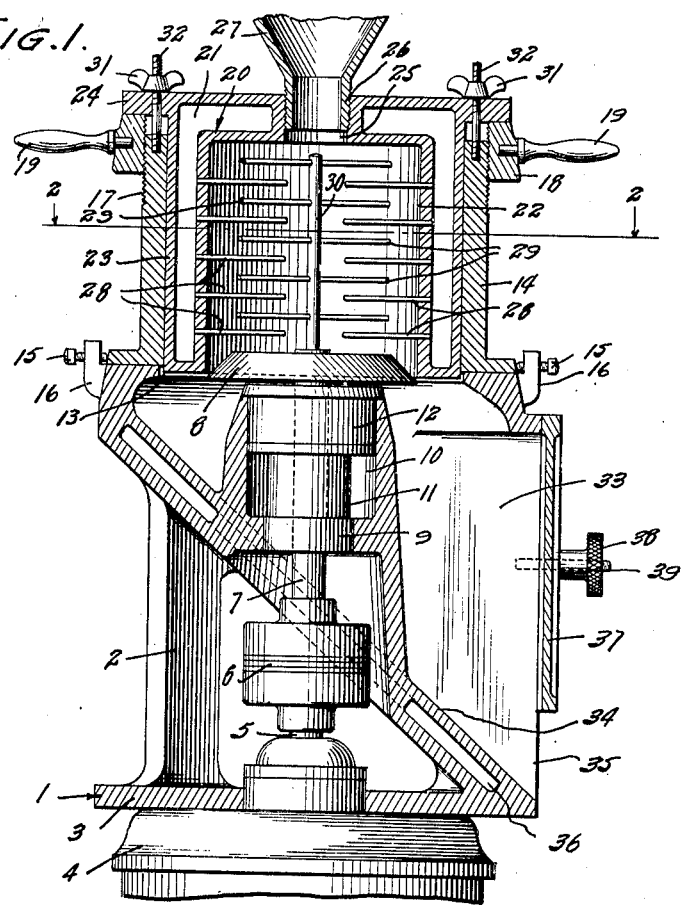
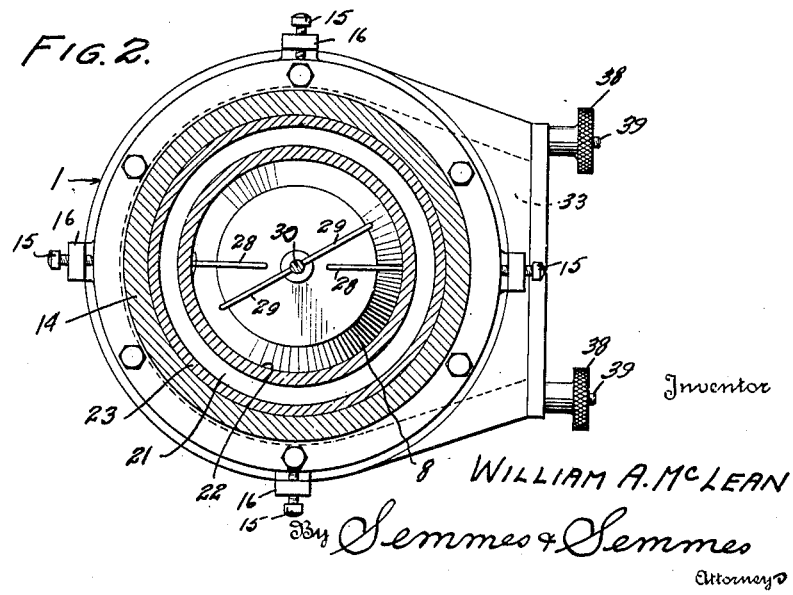
Inventor
WILLIAM A. McLEAN
By Semmes & Semmes
Attorneys

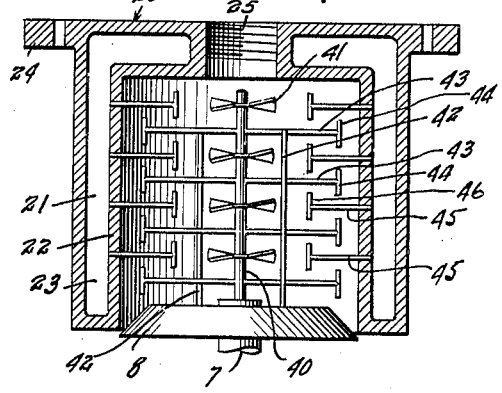

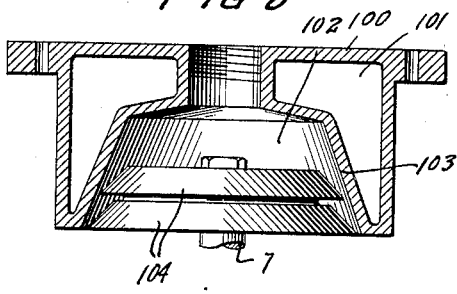
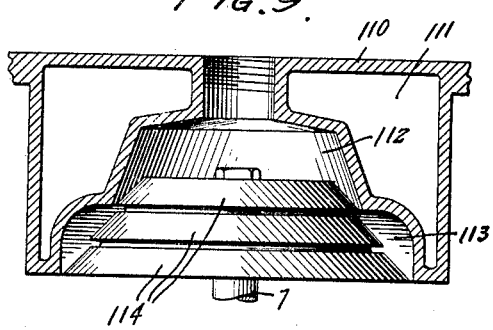
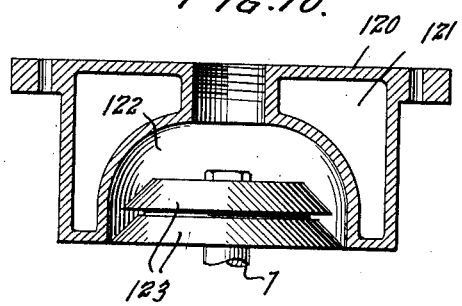
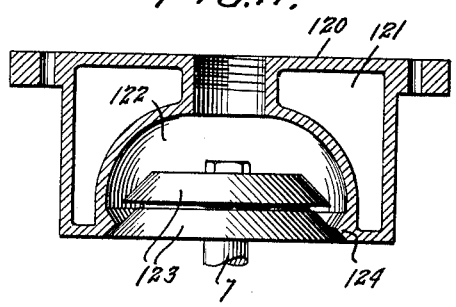
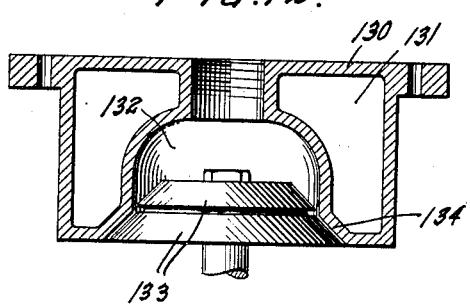

Patented Aug. 2, 1938

2,125,455

UNITED STATES PATENT OFFICE 2,125,455

MIXING DEVICE FOR PREPARING MIXTURES SUCH AS MAYONNAISE AND SALAD DRESSING

William A. McLean, Geneva, N. Y., assignor to Geneva Processes, Inc., Geneva, N. Y., a corporation of New York Application March 31, 1936, Serial No. 71,932

7 Claims. (Cl. 259—9)

My invention relates to mixing and emulsifying devices for materials such as emulsions containing high percentages of oil, such as mayonnaise, salad dressing, insecticide emulsions, etc. The mixtures may or may not be truly colloidal.

An object of my invention is to provide a device of the character described which will quickly and simply make a homogeneous mixture, or a colloid, if desired.

A further object of the invention is to provide a construction which is simple and durable and which is easily repaired and with parts easy to replace.

A still further object of my invention is to provide a mixing mill which has a large output with small consumption of power and which gives a desired homogeneity to the final product.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings,

Figure 1 is a view in longitudinal section of one form of my mill;

Figure 2 is a view taken along the line 2—2 of Figure 1, looking in the direction of the arrows;

Figure 3 is a sectional view showing a mixing chamber and rotor construction of another form of mill;

Figure 4 is a sectional view showing the mixing chamber and rotor construction of yet another form of mill;

Each of the Figures 5 to 12, inclusive, are illustrations showing in section mixing chambers and rotor constructions of different types of mills, each of the drawings showing a different modification.

Referring to the drawings I have shown a support structure 1 provided with support spiders 2, the base of the support structure 1 being designated by the numeral 3. The base 3 is adapted to lie on the casing 4 of an electric motor. The shaft of the motor projects upwardly, as indicated at 5, and is coupled by means of a coupling 6 to a shaft 7 of a rotor member 8. The shaft 7 is journaled in the supporting structure 1 at a point 9. Above the point 9, and forming the casing, is a cylindrical aperture 10 in which are housed journal members 11 and 12. The rotor 8 is a frusto-conical element with a smooth surface. Mounted over a cylindrical aperture 13 formed in the upper part of the support structure 1 is a cylindrical support element 14 which is held by means of nuts 15 screwed through brackets 16 in the support structure 1 into a position such that its interior surface is substantially in line with the periphery of the aperture 13.

The support member 14 is provided with screw threads 17. At its top, screwed over the screw threads, is a screw threaded annulus 18 adapted to be manipulated by operating handles 19. Adapted to fit within the aperture formed in the support element 14 is a mixing chamber 20 comprising a water or steam jacket 21 which may be suitably connected to a supply of cooling or heating fluid (connections not shown), a central chamber 22 and an exterior wall 23.

Formed at the top of this member 20 is a flange 24 which is adapted to rest on top of the annulus 18. In the top of the member 20 is an aperture 25 which is interiorly threaded and which is adapted to receive screw threaded extension 26 of a filling funnel or hopper 27. Mounted on the interior of the member 20 are arms 28 which project inwardly and which are in staggered parallel relationship with arms 29 attached to a vertical rod 30 mounted in the center of the upper surface of the rotor 8.

The clearance between the rotor 8 and the bottom of the mixing chamber, i. e., the bottom of the interior portion 22 of the mixing chamber, is controlled by raising and lowering the entire mixing chamber construction 20 by means of rotating the handles 19 to screw the annular member 18 up or down, as desired. When the proper adjustment has been made, wing nuts 31 on the bolts 32 may be tightened to hold the adjustment fixed.

Below the bottom of the rotor is a receiving chamber 33 which is provided with a slanted chute-like element 34 against which the mixture falls. The mixture, such as mayonnaise, flows down the chute element 34 and out at the aperture 35. The chute element 34 may be provided with apertures 36 through which may be flowed steam or cooling liquid, as desired.

In order to prevent splashing of the material, aperture 35 is closed with a cover plate 37 which is held in place by knurled nuts 38 which are screwed on bolts 39 inserted in the metal of the support element 1, such as by screwing them into apertures formed in the support element 1.

In operation the required adjustment between the bottom of the mixing chamber 22 and the surface of the rotor 8 having been effected, the mixture is poured into the mixing chamber 22 until the surface of the rotor is completely covered, and in fact, under certain conditions, it is well to have the entire mixing chamber 22 filled with the rough mixture before mixing is started.

The motor is then started and the elements 29 whip around between the elements 28 and effect the mixture. The mixture is further homogenized in passing out through the aperture between the bottom of the mixing chamber 22 and the rotor 8. The mixing chamber 22 can be cooled or heated by the fluid in its jacket as desired. The finished mixture, which may be mayonnaise or some similar material, falls into the space 33 below the rotor 8 where it may be either heated or cooled through fluid in the aperture 36 below the slide 34. The material flows out through the aperture 35 into a receptacle.

In Figure 3 I have shown another form of my device in which the frusto-conical rotor 8 is provided with a centrally mounted rod 40 provided with paddle wheels 41 which may be of the propeller type. There are a plurality of additional supports 42 which are parallel to the rod 40. The rod 40 and the parallel supports 42 support arms 43 which are preferably at right angles to the supports 42. The arms 43 terminate in end members 44. The interior of the mixing chamber 22 is provided with arms 45 which also carry end members 46 similar in construction to end members 44. This construction churns up the material and forms a good premix in the chamber 22.

In Figure 4 I have shown a construction comprising a chamber casting 50 which is adapted to slide up and down in the annular support 14. This construction is provided with a fluid chamber 51 which communicates through apertures 52 with an upper fluid chamber 53. The upper fluid chamber 53 is formed in a casting 54. The castings 50 and 54 form an oval mixing chamber 55 which has an upper opening 56 through which material is fed thereto. The lower part of the oval mixing chamber is provided with an aperture 57 which feeds into a chamber 58 with frusto-conical walls 59.

The rotor 8 is provided with pins on its upper surface 60 of different height. There is a centrally mounted rod 61 which carries oval beaters 62. The material passes into the oval chamber where it is subjected to the action of the oval beaters 62 and then passes into chamber 59 where pins 60 act upon the material, and from there it passes between the rotor 8 and the frusto-conical surface 59 whence it is discharged.

In Figure 5 I have shown a mixing chamber casting 70 which is provided with a chamber 71 and a frusto-conical chamber 72. There is a fluid chamber 73 to either heat or cool the material treated. The rotor 8 is provided with propeller-like members 74 and upstanding pins 75 on the top of the rotor. On the frusto-conical surface of the rotor are other pins 76. These pins are in staggered relationship with pins 77 on the frusto-conical surface 72.

In the form of mill shown in Figure 6 I provide a mixing chamber construction 80 having a conical chamber 81 and a fluid chamber 82. The conical chamber 81 contains a conical rotor 83 having pins 84 on its upper surface lying in staggered relationship to the pins 85 formed on the conical interior surface 81 of the mixing chamber.

In Figure 7 is shown a mixing chamber construction 90 which is provided with a fluid chamber 91 and mixing chamber proper 92 of cylindrical shape. There is provided in this construction a rotor 93 of globular shape provided with pins 94. Some of the pins 94 have lying between them pins 95 fixed to the inner surface of the chamber 92.

In Figure 8 is shown another form of mixing chamber 100 provided with a fluid jacket 101 and mixing chamber proper 102 which is of frusto-conical shape and provided with frusto-conical walls 103. The rotor has two frusto-conical surfaces 104 which are in staggered relationship to each other.

Yet another form is shown in Figure 9 in which the mixing chamber is designated by the numeral 110. The fluid chamber is designated 111. This construction comprises an upper frusto-conical mixing chamber proper provided with an outwardly rounded mixing chamber section 113. Within the mixing chambers 110 and 113 is a triple rotor 114 comprising frusto-conical segments which are in staggered relationship to each other.

Figure 10 shows a form of mixing chamber 120 provided with a fluid chamber 121 for either heating or cooling fluid. The mixing chamber proper 122 is bowl-shaped and within this bowl shaped mixing chamber 122 I have shown frusto-conical rotors 123 in staggered relationship.

Figure 11 is somewhat similar to Figure 10 but the bowl-shaped mixing chamber 122 is provided at its base with a frusto-conical working surface 124 which lies adjacent the lower one of the frusto-conical rotors 123 and which parallels the surface of such rotor.

In Figure 12 I have shown a mixing chamber 130 having a fluid chamber 131 for heating or cooling the material being treated and a bowl-shaped mixing chamber proper 132. In this construction I have shown two frusto-conical rotor members 133 with two frusto-conical sections having end surfaces lying in a continuation of each other. In this form of device there is provided a frusto-conical working surface 134 of the mixing chamber which is somewhat larger than the frusto-conical surface 124. The construction is such that the lower frusto-conical rotor surface is substantially of the same dimensions as the working surface 134.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a mixing and emulsifying mill, a rotor, a premixing chamber above the rotor, there being left an aperture between the rotor and the bottom of the premixing chamber for the mixture to pass, a centrally located rod on the rotor, propeller vanes on the rod, arms in part supported by the rod and extending substantially at right angles to the rod, and a plurality of additional supports for the arms mounted on the upper surface of the rotor.

2. In a mixing and emulsifying mill, a rotor, a premixing chamber above the rotor, there being left an aperture between the rotor and the bottom of the premixing chamber for the mixture to pass, a centrally located rod on the rotor, propeller vanes for the rod, arms on the rod, and arms on the interior of the premixing chamber in staggered relationship to the arms on the rod.

3. In a mixing and emulsifying mill, a rotor, a premixing chamber above the rotor, there being left an aperture between the rotor and the bottom of the premixing chamber for the mixture to pass, a centrally located rod on the rotor, propeller vanes on the rod, arms in part supported by the rod and extending substantially at right angles to the rod, a plurality of additional supports for the arms mounted on the upper surface of the rotor, arms on the interior of the premixing chamber in staggered relationship to the first-mentioned arms.

4. In a mixing and emulsifying mill, a rotor, a premixing chamber above the rotor, there being left an aperture between the rotor and the bottom of the premixing chamber for the mixture to pass, a centrally located rod on the rotor, propeller vanes on the rod, arms in part supported by the rod and extending substantially at right angles to the rod, a plurality of additional supports for the arms mounted on the upper surface of the rotor, arms on the interior of the premixing chamber in staggered relationship to the first-mentioned arms, and end members on all the rods mounted substantially parallel to the supports.

5. In a mixing and emulsifying mill, a rotor, a premixing chamber above the rotor, there being left an aperture between the rotor and the bottom of the premixing chamber for the mixture to pass, a centrally located rod on the rotor, propeller vanes on the rod, and arms in part supported by the rod.

6. In a mixing and emulsifying mill, a rotor, a premixing chamber above the rotor, a centrally located rod on the rotor, propeller vanes on the rod, arms in part supported by the rod and extending substantially at right angles to the rod, and a plurality of additional supports for the arms mounted on the upper surface of the rotor.

7. In a mixing and emulsifying mill, a rotor, a premixing chamber above the rotor, a centrally located rod on the rotor, propeller vanes for the rod, arms on the rod, and arms on the interior of the premixing chamber in staggered relationship to the arms on the rod.

WILLIAM A. McLEAN.